United States Patent [19]

Padovan

[11] Patent Number: 5,213,685
[45] Date of Patent: May 25, 1993

[54] CYCLE OF FILTRATION FOR LIQUIDS CONTAINING SOLIDS IN SUSPENSION AND ROTARY FILTER SUITED TO REALIZE SAID CYCLE OF FILTRATION

[75] Inventor: Giorgio Padovan, Montecchio Maggiore, Italy

[73] Assignee: Fratelli Padovan SNC, Maggiore, Italy

[21] Appl. No.: 718,440

[22] Filed: Jun. 20, 1991

[30] Foreign Application Priority Data

Jun. 22, 1990 [IT] Italy .............................. 85588 A/90

[51] Int. Cl.⁵ .......................................... B01D 33/06
[52] U.S. Cl. .................................. 210/326; 210/327; 210/333.01; 210/393; 210/396; 210/402; 210/406; 210/408
[58] Field of Search ............... 210/326, 327, 393, 396, 210/402, 406, 408, 333.01

[56] References Cited

U.S. PATENT DOCUMENTS

| | | | |
|---|---|---|---|
| 3,772,684 | 3/1973 | Maestrelli | 210/167 |
| 3,919,088 | 11/1975 | Doncer et al. | 210/408 X |
| 4,151,094 | 4/1979 | Wyman | 210/408 X |
| 4,242,204 | 12/1980 | Stigebrandt | 210/326 |
| 4,303,524 | 12/1981 | Richards et al. | 210/408 X |
| 4,836,917 | 6/1989 | Tomita et al. | 210/104 |
| 4,869,823 | 9/1989 | Otani et al. | 210/394 X |

FOREIGN PATENT DOCUMENTS

| | | |
|---|---|---|
| 1177614 | 9/1964 | Fed. Rep. of Germany . |
| 90055039 | 8/1990 | Fed. Rep. of Germany . |
| 2249701 | 5/1975 | France . |
| 1456669 | 11/1976 | United Kingdom . |

Primary Examiner—Robert A. Dawson
Assistant Examiner—David Reifsnyder
Attorney, Agent, or Firm—Birch, Stewart, Kolasch & Birch

[57] ABSTRACT

A cycle of filtration is realized for liquids containing solids in suspension and a rotary filter, suited to realize and cycle, where the filtration is carried out by a rotary drum fitted with a filtering surface (2), immersed in a tank containing the liquid to be filtered (26). The phase of the separation of the filtered material deposited on the filtering surface is preceeded by a phase of removal of the material from the filtering surface carried out by using air blown from a slit and it is followed by a phase of washing of the filtering surface, carried out by a plurality of sprayers.

19 Claims, 3 Drawing Sheets

CYCLE OF FILTRATION FOR LIQUIDS CONTAINING SOLIDS IN SUSPENSION AND ROTARY FILTER SUITED TO REALIZE SAID CYCLE OF FILTRATION

BACKGROUND OF THE INVENTION

1. Field of the Invention

The invention concerns the realization of cycle of filtration for liquids containing solid substances in suspension and of a rotary filter suited to carry out such a cycle of filtration.

2. Description of Related Art

Rotary filters of different types are known, through which the filtration of the liquids containing solids in suspension is carried out. Said rotary filters are widely used, for instance in the production cycle of food companies, in the fur trade, in chemical industries as well as others, or they are employed in each of those cases in which it proves to be necessary at the end of a production process to separate any residually suspended solids from the liquids before the phase of purification of the latter.

The mentioned rotary filters, though with different executive variations which make them suitable for various uses, essentially consist of a tank containing the liquid to be filtered, in which a rotary drum is immersed on which a filtering surface is placed. The liquid, passing through the filtering surface, deposits on it the solids in suspension, which are collected and removed using various types of mechanical systems. The filtered liquid is collected inside the rotary drum and is sent by pumps for use or to the purification plant. However, the rotary filters of the known type present a difficulty for how easily their filtering surfaces become obstructed. It is understood that the amount of solids deposited on the filtering surfaces in the unit of time is directly proportional both to the rate of flow through the filtering surface itself, and to the degree of filtration resulting from it, so that the obstruction of the filtering surfaces takes place when one of the mentioned parameters proves to be higher than the maximum value for the rotary filter in use. The rotary filters presently in use, in fact, present the problem that if the purpose is to generate high flow rates and high filtrations at the same time, their filtering surfaces become very rapidly obstructed and the user is frequently forced to stop the filter in order to clean the filtering surfaces. To avoid this, using the known rotary filters a compromise is usually made, which is to filter quite limited rates of flow and to produce reasonably reduced degrees of filtration to avoid the continual obstruction of the filtering surfaces.

SUMMARY OF THE INVENTION

The purpose of this invention is to overcome the mentioned limitations typical the rotary filters of the known type, producing a rotary filter which, although working with bigger flow rates and producing higher filtrations than the known rotary filters of the same size, should not be subject to the obstruction of the filtering surfaces or that however might suffer the obstruction of the filtering surfaces with much less frequency than in known rotary filters.

The described purpose is achieved through the production of a filtration cycle for liquids containing solids in suspension which, according to the main claim, comprises:

an optional phase of pre-filtration of the liquid by sifting through a pre-filtering surface;

a phase of introduction of the liquid to be filtered into a collecting tank;

a phase of filtration of the liquid present in the collecting tank through a filtering surface in rotary movement;

a phase of drying of the material deposited on the filtering surface;

a phase of separation and extraction of the material deposited on the pre-filtering surface and on the filtering surface;

a phase of extraction of the filtered liquid, and it is characterized in that the phase of separation of the filtered material which has been deposited on the filtering surface is followed by a phase of washing of the filtering surface itself.

For the filtering of liquids containing suspended solids of a particular kind, the phase of separation of the impurities of the filtered material deposited on the filtering surface is preceded by a phase of removal of the filtered material from the filtering surface itself.

The rotary filter which carries out the described cycle of filtration includes:

the possibility of a pre-filtration block;

a collecting tank for the liquid to be filtered;

at least one rotary drum immersed in the liquid of the collecting tank, consisting of a pair of coaxial disks placed opposite each other, on the perimeters of which a filtering surface is constructed;

a suction duct placed inside the rotary drum at the top of it, linked to the suction part of at least one pneumatic machine for the drying by vacuum of the material deposited on the filtering surface;

at least one pump for the extraction of the filtered liquid out of the rotary drum;

devices for the separation and extraction of the pre-filtered material and of the filtered material;

means of rotation for each rotary drum and it is characterized in that a plurality of sprayers placed inside the rotary drum next to the devices for the separation of the filtered material from the filtering surface and preferably in line with one another along the whole width of the filtering surface itself, carry out the washing of the filtering surface itself.

For the filtration of liquids containing suspended solids of a particular kind, inside the rotary drum there is at least one blowing slit which is arranged before the separating devices of the filtered material from the filtering surface and preferably along the whole width of the filtering surface itself, which carries out the removal of the filtered material from the filtering surface itself.

In a preferred form of execution the prefiltration block of the rotary filter of the invention is placed on the upper back part of the collecting tank for the liquid to be filtered and it consists of a pre-filtering surface, preferably a perforated sheet attached to the tank, which is passed through by the liquid to be filtered falling out of gravity and on which some moving scrapers are placed. Said scrapers consist of brushes placed at the extremities of a rotary reel, that move tangentially to the pre-filtering surface itself, remaining adherent to it.

Advantageously, by means of the rotary filter of the invention, it is possible to obtain higher flow rates and more forced filtrations than with normal rotary filters of the same size, while reducing the obstructions of the filtering surfaces.

BRIEF DESCRIPTION OF THE DRAWINGS

The description of the filtration cycle for liquids containing suspended solids and of the rotary filter suited for carrying out such a cycle of filtration is illustrated, by way of example, in the accompanying drawings in which.

DETAILED DESCRIPTION OF PREFERRED EMBODIMENTS

Figure 1:
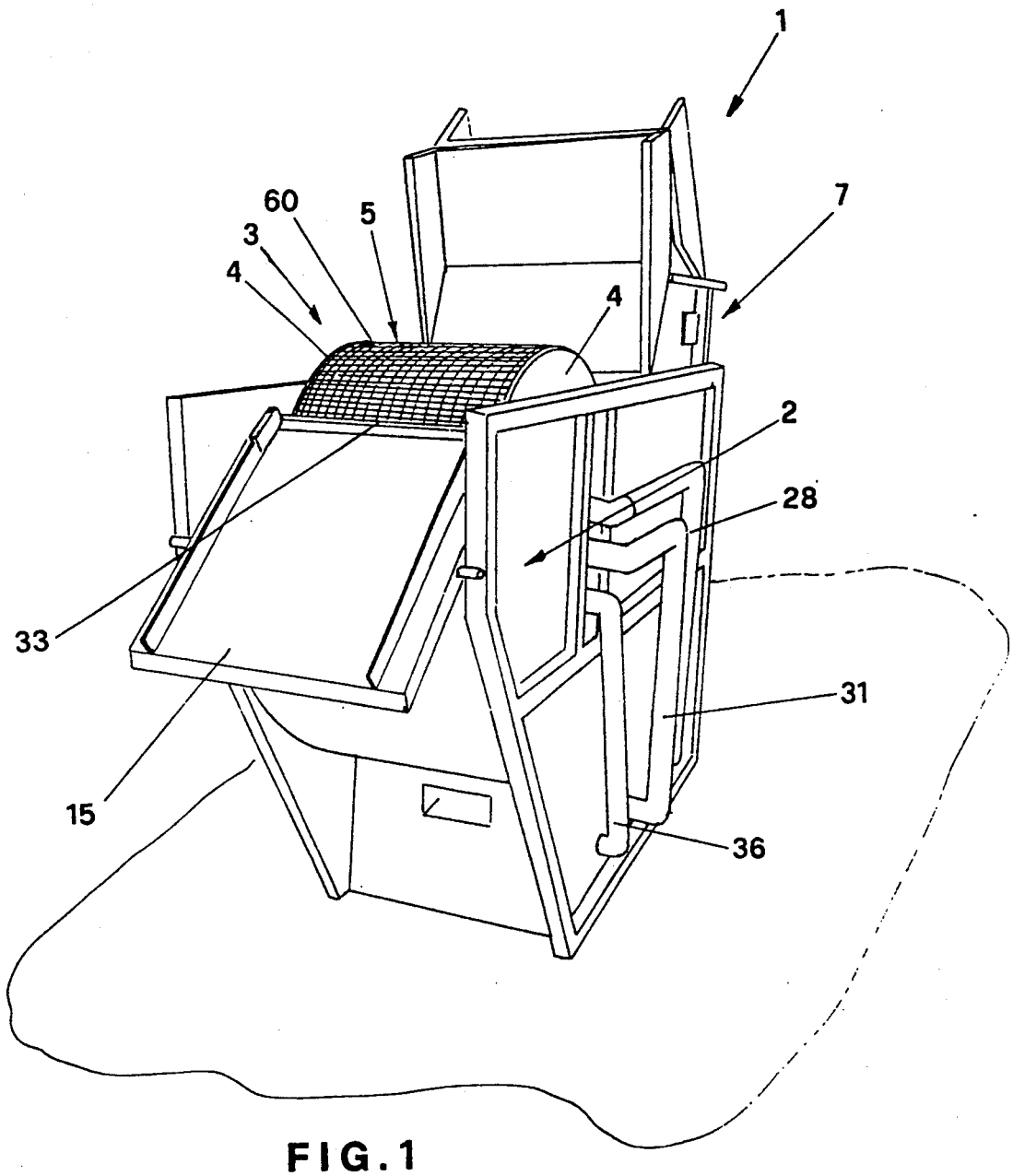
FIG. 1 is the assonometric representation of the filter according to the invention.
Figure 2:
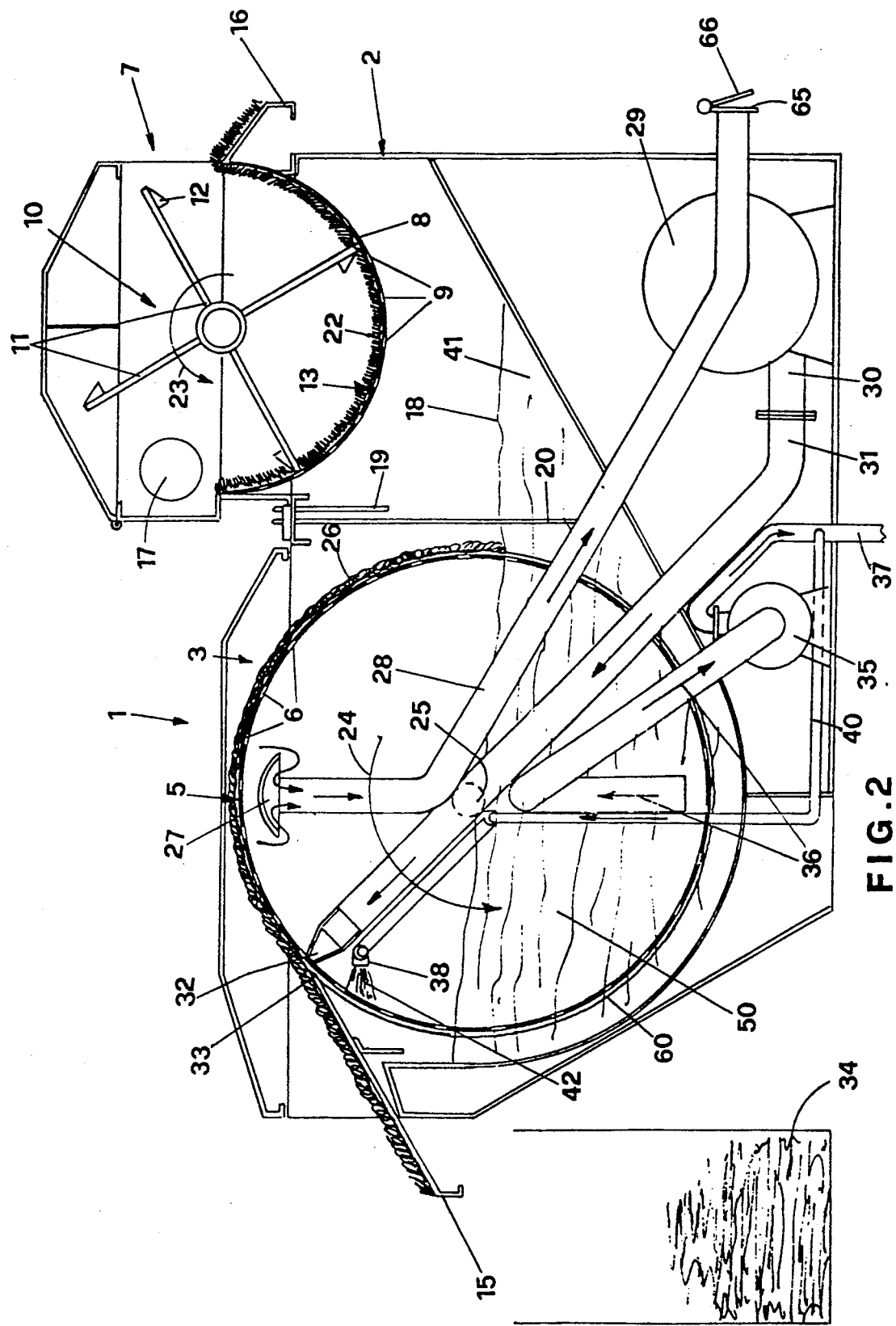
FIG. 2 is a longitudinal section of the rotary filter according to the invention.
Figure 3:
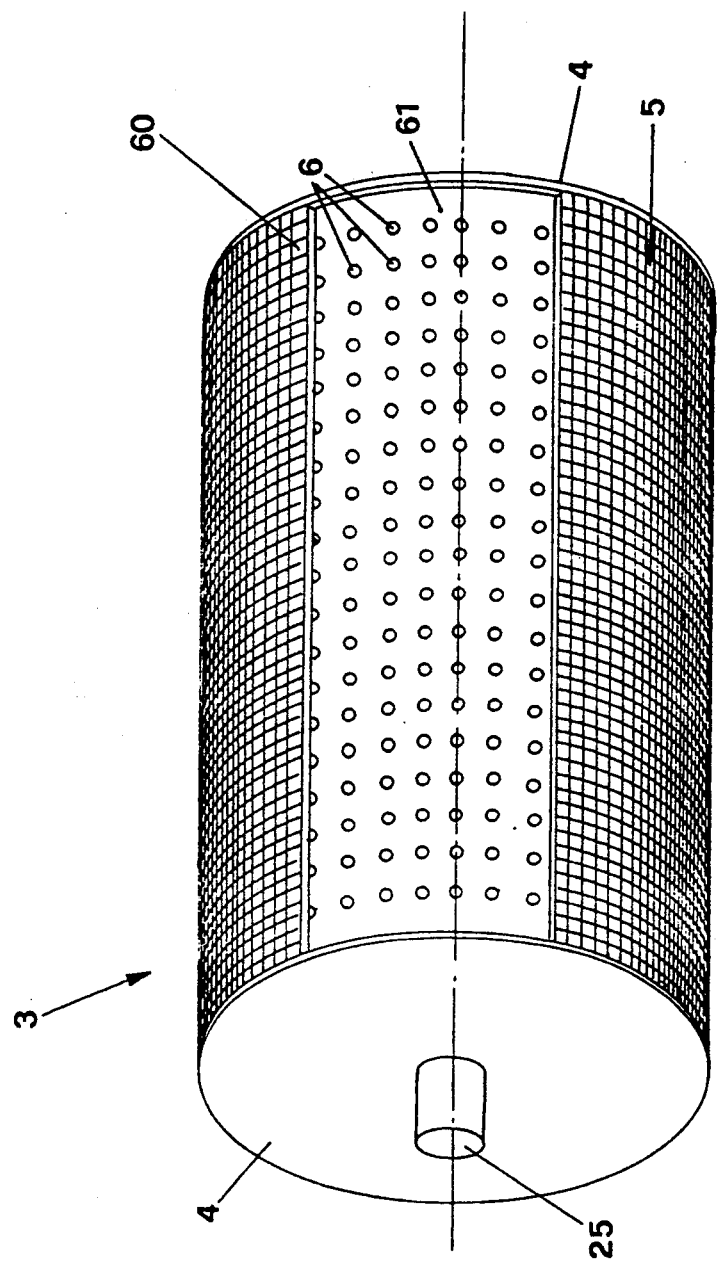
FIG. 3 is a detail of the rotary drum of the rotary filter with the filtering nets.

As can be seen in FIG. 1, the rotary filter of the invention, indicated as a whole with 1, is made up of a tank 2 to which a rotary drum 3 is applied, which is placed inside the tank 2 itself and, as can be seen in greater detail in FIG. 2, is partially immersed in the liquid 41, which is inside the tank 2 itself. The rotary drum 3, as is visible in FIG. 3, consists of a pair of coaxial interfacing disks, on the perimeters of which a sheet 61 with a plurality of holes is placed around and welded. On it a net 60 with small-sized holes is placed. The sheet 61 and the net 60 constitute the filtering surface. According to the kind of liquid to be filtered, the net 60 can have holes of different sizes and, if necessary, can be substituted by a cloth. In the upper-back part of the tank 2, a pre-filtering block 7 is placed which consists of a pre-filtering surface 8, which is preferably constituted by a sheet with a plurality of holes 9 and by a rotary reel 10 with arms 11 at the extremities of which a scraper 12 is placed. Each scraper 12 may be for instance, but not necessarily, a brush, which as it rotates brushes against the inner surface 13 of the pre-filtering surface 8.

In the forward area of the rotary filter and particularly in front of the rotary drum 3 and along its whole width, the front chute 15 is placed, with a scraping edge 33 touching the filtering surface 5 with the purpose of producing the removal and the extraction by gravity of the filtered material deposited on the filtering surface 5 of the drum 3 itself.

In the same way, in the rear part of the rotary filter 1 and corresponding with the pre-filtering block 7 and extending on the whole width of the pre-filtering surface 8, a back chute 16 is placed, with the purpose of moving by gravity ouside the tank 2 the material 22 deposited on the inner side 13 of the prefiltering surface 8 itself and collected by the scrapers 12 during their rotation.

It has to be specified at this point that the described rotary filter of the invention can be built without the pre-filtering block 7 and therefore can consist simply of the collecting tank 2 for the liquid 41 and of the rotary drum 3.

To carry out the filtration of any liquid 41 containing solid particles in suspension, it is vital first of all to introduce the liquid itself into the pre-filtering block 7 through the hole 17. The liquid is sent to the hole 17 by means of a pumping system (not shown in the figures) and it passes by gravity through the holes 9 of the pre-filtering surface 8, which is a part of the pre-filtering block 7, and it accumulates inside the tank 2 until it reaches, for instance, level 18. Such a level is monitored by a pair of sensors, specifically by the maximum level sensor 19 and by the minimum level sensor 20, which intervene if level 18 reaches the maximum or the minimum level controlled by each of them.

The liquid 41 passing by gravity through the pre-filtering surface 8 deposits on its inner side 13 some of the impurities 22 it contains, which are sent outwards on the rear chute 16 by the scrapers 12 during the rotation of the wheel 10 in a counter-clockwise direction (see the arrow 23). It should be noted, anyway, that the pre-filtering surface 8 carries out simply a rather rough pre-filtration, because the diameter of its holes 9 is quite large and therefore only the impurities 22 of greater dimensions are deposited on its inner side 13.

The actual filtering of the liquid 41 takes place in the rotary drum 3 which, as is visible in FIG. 2, turns in a counter-clockwise direction (see the arrow 24) round its axis of rotation by known means of rotation such as, for instance, a gearmotor (not shown in the figures). In fact, when the liquid 41 filters through the holes of the net 60 which forms the filtering surface 5, it deposits on it all the impurities 26 that it carries in suspension and that have the same or bigger dimensions than the holes of the filtering surface 5 itself. Such impurities 26 stick to the filtering surface 5 and therefore follow the rotary drum during the rotation.

At a corresponding level with the top of the drum 3 and in its interior a suction duct 27 is placed which, by means of a pipeline 28 is linked to the suction of a pneumatic machine, preferably a fan 29. When the fan 29 is turned on, it creates a depression through the suction duct 27 in the area immediately beneath the impurities 26 deposited on the filtering surface 5 and it causes their partial drying.

At a corresponding level with the suction line 28 connected with the fan 29, an external air intake 65 is placed, adjustable by means of an air lock 66, used to register the degree of depression in the area underneath the upper part of the rotary drum 3, in correspondence with the top of it, where the impurities 26 are deposited, according to the quantity and quality of the latter. When the impurities 26, as an effect of the rotation of the rotary drum 3, come in contact with the scraping edge 33 of the front chute 15, they are detached and slide along the front chute 15 itself by force of gravity and fall down inside an optional container 34 where they are collected. The process of filtration goes on as long as the rotation of the drum 3 continues and as long as the level 18 of the liquid 4 inside the tank 2 is maintained by the checking sensors 19 and 20.

At the same time as the filtering and extraction of the impurities 26 which accumulate in the container 34, a pump 35 sucks in through a pipe 36 the filtered liquid 50 from the inside of the rotary drum 3 and through a further line of delivery 37 conveys it to the exterior towards its use or to an optional purification system.

A return pipe 40 comes out of the delivery pipe 37 and sends part of the mass flowing through the delivery pipe 37 itself to a plurality of sprayers 38 present inside the surface 5 of the drum 3 and arranged along its whole width.

Such sprayers 38 send a jet 42 of already filtered liquid against the internal wall of the filtering surface 5, so that any impurities left in the holes of the filtering surface 5 itself are necessarily removed and fall down into the bath 41 outside the rotary filter 3, and therefore not yet filtered. It is the presence of such sprayers 38, whose working is intermittent and adjustable using a timer, which improves the degree of cleanliness of the filtering surface 5 and which avoids the obstruction of the holes of the filtering surface 5 itself.

It has to be observed that the washing jets 42, instead of consisting of the filtered liquid drawn out of the delivery pipe 37, can also be of any other liquid, for instance water or steam drawn from the outside.

During the filtration of liquids containing suspended solids of a particular kind or, anyway, in any case that proves necessary, the phase of removal of the impurities 26 from the filtering surface 5 can be preceded by a phase of detachment which helps to remove them.

This is carried out, as can be seen in FIG. 2, through a blowing slit 32 placed in the drum 3 before the scraping edge 33, which skims inside the filtering surface 5 along its whole width. The slit is fed with the air sucked from the fan 29, which is drawn out of the delivery 30 of the fan itself and is conveyed through the pipe 31 to the blowing slit 32. The slit 32 directs the air jet, with reference to the sense of rotation 24 of the rotary drum 3, just before the point where the scraping edge 33 of the front chute 15 scrapes down the impurities 26 found outside the filtering surface 5. The air jet, when blown in this way, helps the detachment of the impurities 26 from the surface on which they are deposited shortly before their removal, thus helping the process of removal of the scraping edge 33.

It is obvious that such a blowing action, when it takes place, also contributes, together with the washing sprayers, to keep the filtering surface 5 clean.

According to what has been described, it can be understood how the rotary filter of the invention fulfils all the proposed purposes.

It has been noted that the presence of the sprayers 38 and, when it is present, the slit 32 for the blowing of the air, keeps the filtering surface 5 clean, avoiding obstruction of its holes. Therefore, intervention involving the stopping of the machine for cleaning is eliminated or in any case reduced.

As far as specifically the degree of filtering is concerned, it depends on the dimensions of the holes made on the net 60 of the filtering surface 5. Since it has been seen that due to the presence of the sprayers 38 and the blowing slit 32, when it is present, it is possible to keep the holes 6 of the filtering surface 5 clean, it is understood that filtering surfaces 5 with very small-sized holes can be applied to the rotary filter of the invention, thus obtaining very high filtrations that still have a high rate of flow.

Experiments carried out on prototypes have proven that with equal flow rates and machine dimensions, using the rotary filter of the invention, it is possible to produce, without any interruption for the cleaning of the filtering surface, filtrations as high as 45 micron, while with equivalent known machines no filtrations at levels less than 500 micron are carried out.

The machine of the invention in its phase of realization can be modified in order to improve its operation or to make its realization easier. For that purpose, for instance, a plurality of drums could be placed in line with one another inside only one tank.

Moreover, on the rotary drum some nets 60 with holes of various size could be attached, in order to obtain different filtering surfaces 5 which produce more or less high filtrations according to the nature of the solids suspended in the liquid.

It is however understood that any variations are to be considered patronized by the present invention.

I claim:

1. A rotary filter for liquids comprising:
a pre-filtration block;
a collecting tank positioned beneath said pre-filtration block;
means for introducing the liquid to be filtered to an interior of said pre-filtration block;
means for introducing pre-filtered liquid from said pre-filtration block into said collecting tank;
at least one rotary drum immersed in the pre-filtered liquid, said at least one rotary drum including a pair of opposing coaxial disks and a filtering surface wrapped around the pair of disks;
a suction duct housed within said at least one rotary drum at a position out of contact with the pre-filtered liquid and adjacent to an inner peripheral surface of said at least one rotary drum;
means for rotating said at least one rotary drum through the pre-filtered liquid for further filtering thereof, such that filtered material is deposited on an outer peripheral surface of said at least one rotary drum;
means for applying suction to said suction duct, thereby at least partially drying the filtered material deposited on said at least one rotary drum at a position of said suction duct;
at least one pump for extracting filtered liquid from said at least one rotary drum through a pipe immersed in the filtered liquid;
first means for scraping filtered material from an inner peripheral surface of said pre-filtering block;
second means for scraping filtered material from the outer peripheral surface of said at least one rotary drum;
a back chute attached to an outlet of said pre-filtering block for discharging filtered material therefrom;
a front chute attached to an outlet of said at least one rotary drum at a position of said second means for scraping for discharging filtered material therefrom; and
a plurality of sprayers, linearly positioned along an entire interior length of and parallel to a longitudinal axis of said at least one rotary drum downstream of said second scraping means in a rotating direction of said at least one rotary drum for washing the inner peripheral surface thereof subsequent to scraping by said second scraping means.

2. The rotary filter according to claim 1, further including at least one blowing slit positioned inside of and against the inner peripheral surface said at least one rotary drum immediately in advance of said second scraping means for dislodging the filtered material from the outer peripheral surface of said at least one rotary drum.

3. The rotary filter according to claim 2, wherein a plurality of said at least one blowing slit are linearly positioned along the entire interior length of and parallel to the longitudinal axis of said at least one rotary drum.

4. The rotary filter according to claim 2, wherein said filtering surface includes a sheet member having a plurality of apertures formed therein and a net member formed over said sheet member, wherein said sheet member and said net member are welded to said pair of opposing coaxial disks.

5. The rotary filter according to claim 2, wherein said pre-filtering block includes a pre-filtering surface having a plurality of apertures formed therein, and wherein the liquid introduced by said means for introducing is gravity fed through said pre-filtering surface into said collecting tank.

6. The rotary filter according to claim 2, wherein said back chute is linearly positioned along an entire exterior length of the pre-filtering surface of said pre-filtering block.

7. The rotary filter according to claim 2, wherein said front chute is linearly positioned along an entire exterior length of the filtering surface of said at least one rotary drum.

8. The rotary filter according to claim 2, wherein said first means for scraping includes a rotary wheel having a plurality of arms extending therefrom and a scraping blade attached to a distal end of each of said plurality of arms.

9. The rotary filter according to claim 2, wherein said second scraping means is connected to said front chute to form a one-piece element.

10. The rotary filter according to claim 2, wherein said plurality of sprayers are fed through a pipe drawn from a delivery pipe of said at least one pump.

11. The rotary filter according to claim 1, wherein said filtering surface includes a sheet member having a plurality of apertures formed therein and a net member formed over said sheet member, wherein said sheet member and said net member are welded to said pair of opposing coaxial disks.

12. The rotary filter according to claim 1, wherein said pre-filtering block includes a pre-filtering surface having a plurality of apertures formed therein, and wherein the liquid introduced by said means for introducing is gravity fed through said pre-filtering surface into said collecting tank.

13. The rotary filter according to claim 12, wherein said pneumatic device is a fan.

14. The rotary filter according to claim 1, wherein said back chute is linearly positioned along an entire exterior length of the pre-filtering surface of said pre-filtering block.

15. The rotary filter according to claim 1, wherein said front chute is linearly positioned along an entire exterior length of the filtering surface of said at least one rotary drum.

16. The rotary filter according to claim 1, wherein said first means for scraping includes a rotary wheel having a plurality of arms extending therefrom and a scraping blade attached to a distal end of each of said plurality of arms.

17. The rotary filter according to claim 1, wherein said second scraping means is connected to said front chute to form a one-piece element.

18. The rotary filter according to claim 1, wherein said means for applying suction includes a pneumatic device for drawing air through an interconnecting pipe.

19. The rotary filter according to claim 18, wherein said at least one blowing slit is connected to an output of said pneumatic device through an interconnecting pipe.

* * * * *